US012700109B2

(12) United States Patent
Zhang et al.

(10) Patent No.: US 12,700,109 B2
(45) Date of Patent: Aug. 4, 2026

(54) METHOD AND DEVICE FOR TARGET TRACKING AND STORAGE MEDIUM

(71) Applicant: Fujitsu Limited, Kawasaki (JP)

(72) Inventors: Huigang Zhang, Beijing (CN); Ping Wang, Beijing (CN); Liuan Wang, Beijing (CN); Jun Sun, Beijing (CN)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 18/455,688

(22) Filed: Aug. 25, 2023

(65) Prior Publication Data

US 2024/0070881 A1 Feb. 29, 2024

(30) Foreign Application Priority Data

Aug. 30, 2022 (CN) .......................... 202211046789.5

(51) Int. Cl.
*G06T 7/292* (2017.01)
*G06T 7/246* (2017.01)
*G06T 7/73* (2017.01)

(52) U.S. Cl.
CPC .............. *G06T 7/292* (2017.01); *G06T 7/248* (2017.01); *G06T 7/74* (2017.01); *G06T 2207/10016* (2013.01)

(58) Field of Classification Search
CPC .......... G06T 7/292; G06T 7/74; G06T 7/248; G06T 2207/10016; G06T 7/246;
(Continued)

(56) References Cited

U.S. PATENT DOCUMENTS

| | | | |
|---|---|---|---|
| 6,275,778 B1 * | 8/2001 | Shimada ................ | B25J 9/1633 |
| | | | 702/41 |
| 8,933,986 B2 * | 1/2015 | Schall .................. | H04N 23/698 |
| | | | 348/E7.001 |

(Continued)

FOREIGN PATENT DOCUMENTS

| | | | | |
|---|---|---|---|---|
| JP | 2024016820 A | * | 2/2024 | ............. G06V 10/62 |
| JP | 7581584 B2 | * | 11/2024 | ........... G06V 10/267 |

OTHER PUBLICATIONS

Min; Chulhong et al. "Enabling Cross-Camera Collaboration for Video Analytics on Distributed Smart Cameras", Jan. 27, 2024, IEEE (Year: 2024).*

(Continued)

*Primary Examiner* — John Villecco
*Assistant Examiner* — Alejandro Hernandez
(74) *Attorney, Agent, or Firm* — XSENSUS LLP

(57) ABSTRACT

A method for multi-target multi-camera tracking includes: performing multi-target tracking on a video captured by each of multiple cameras, to extract a tracklet for each target appearing in the video, wherein multiple tracklets for multiple targets are extracted on the basis of multiple videos; extracting a feature for each tracklet; determining orientation of each tracklet based on orientation of the target relative to the camera; dividing the multiple tracklets into multiple groups based on the determined orientations; performing clustering on tracklets in each group based on the extracted features, such that tracklets corresponding to the same target are aggregated into an initial set; performing merging among initial sets obtained by performing clustering on respective groups, such that tracklets corresponding to the same target and having different orientations are merged into a final set; and using the tracklets in the final set as tracking information for the corresponding target.

20 Claims, 6 Drawing Sheets

(58) Field of Classification Search

CPC .. G06T 7/20; G06T 7/207; G06T 7/73; G06T 2207/30196; G06T 2207/30232; G06T 2207/30241; G06V 10/74; G06V 20/41; G06V 10/762; G06V 10/44; G06V 10/764; G06F 18/23

See application file for complete search history.

(56) References Cited

U.S. PATENT DOCUMENTS

| | | | | |
|---|---|---|---|---|
| 9,911,198 | B2* | 3/2018 | Pham | G06V 10/56 |
| 9,975,550 | B2* | 5/2018 | Katoh | B60W 30/0956 |
| 10,121,103 | B2* | 11/2018 | Latapie | G06V 10/82 |
| 10,699,421 | B1* | 6/2020 | Cherevatsky | G06F 18/2113 |
| 11,774,599 | B2* | 10/2023 | Mesadi | G01S 7/032 |
| | | | | 342/357.63 |
| 11,914,025 | B1* | 2/2024 | Farah | G01S 13/72 |
| 11,966,452 | B2* | 4/2024 | Hotson | G06N 3/04 |
| 12,007,469 | B1* | 6/2024 | Farah | G01S 7/417 |
| 2014/0286531 | A1* | 9/2014 | Pham | G06T 7/33 |
| | | | | 382/103 |
| 2016/0101779 | A1* | 4/2016 | Katoh | G08G 1/166 |
| | | | | 340/435 |
| 2018/0137374 | A1* | 5/2018 | Gerardo Castro | G05D 1/0246 |
| 2018/0165576 | A1* | 6/2018 | Latapie | G06N 3/047 |
| 2019/0273871 | A1* | 9/2019 | Chen | H04N 23/695 |
| 2021/0192776 | A1* | 6/2021 | Cai | G06V 20/64 |
| 2022/0245924 | A1* | 8/2022 | He | G06T 7/246 |
| 2022/0277464 | A1* | 9/2022 | Forsgren | G06V 10/25 |
| 2023/0095533 | A1* | 3/2023 | Wong | G06V 40/103 |
| | | | | 382/181 |
| 2023/0136029 | A1* | 5/2023 | Mesadi | G01S 7/032 |
| | | | | 342/357.63 |
| 2023/0237801 | A1* | 7/2023 | Fang | G06T 7/292 |
| | | | | 345/419 |
| 2023/0315209 | A1* | 10/2023 | Rao | G06V 40/28 |
| | | | | 382/103 |
| 2023/0368492 | A1* | 11/2023 | Xu | G06T 7/246 |
| 2023/0401725 | A1* | 12/2023 | Truong | G06Q 30/06 |
| 2023/0419508 | A1* | 12/2023 | Sjöborg | G06N 3/09 |
| 2025/0285295 | A1* | 9/2025 | Kale | G06T 7/248 |

OTHER PUBLICATIONS

Extended European Search Report issued Feb. 8, 2024 in corresponding European Patent Application No. 23192372.3, 8 pages.

You, Sisi et al : "Multi-Target Multi-Camera Tracking With Optical-Based Pose Association", IEEE Transactions on Circuits and Systems for Video Technology, IEEE, USA, vol. 31, No. 8, Nov. 6, 2020 (Nov. 6, 2020), pp. 3105-3117, XP011870058, ISSN: 1051-8215, DOI: 10.1109/TCSVT.2020.3036467 [retrieved on Aug. 2, 2021].

Hsu, Hung-Min et al: "Multi-Target Multi-Camera Tracking of Vehicles Using Metadata-Aided Re-ID and Trajectory-Based Camera Link Model", IEEE Transactions on Image Processing, IEEE, USA, vol. 30, May 17, 2021 (May 17, 2021), pp. 5198-5210, XP011856433, ISSN: 1057-7149, DOI: 10.1109/TIP.2021.3078124 [retrieved on May 24, 2021].

* cited by examiner

S210
determining orientation of the
target relative to the camera in
each target box in the tracklet S220
determining orientation of the
tracklet based on the orientations
of the target in respective target
boxes S230
grouping the multiple tracklets
based on the orientation of the
tracklet

FIG. 4

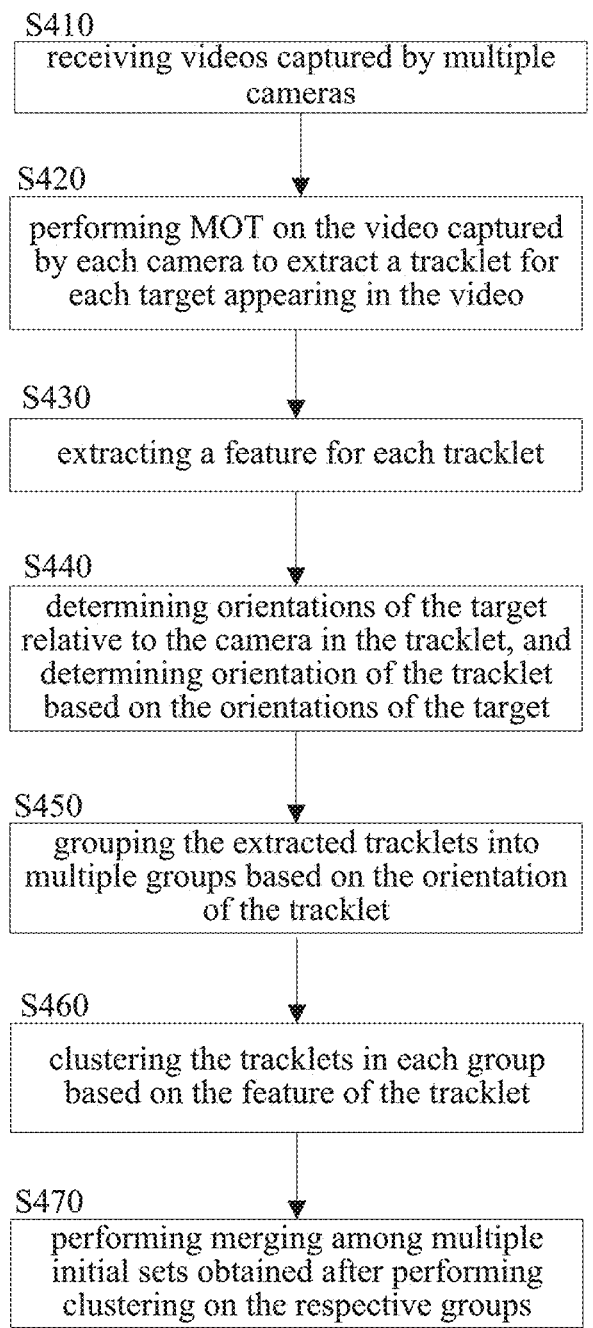

S410 receiving videos captured by multiple cameras

S420 performing MOT on the video captured by each camera to extract a tracklet for each target appearing in the video

S430 extracting a feature for each tracklet

S440 determining orientations of the target relative to the camera in the tracklet, and determining orientation of the tracklet based on the orientations of the target

S450 grouping the extracted tracklets into multiple groups based on the orientation of the tracklet

S460 clustering the tracklets in each group based on the feature of the tracklet

S470 performing merging among multiple initial sets obtained after performing clustering on the respective groups

FIG. 6

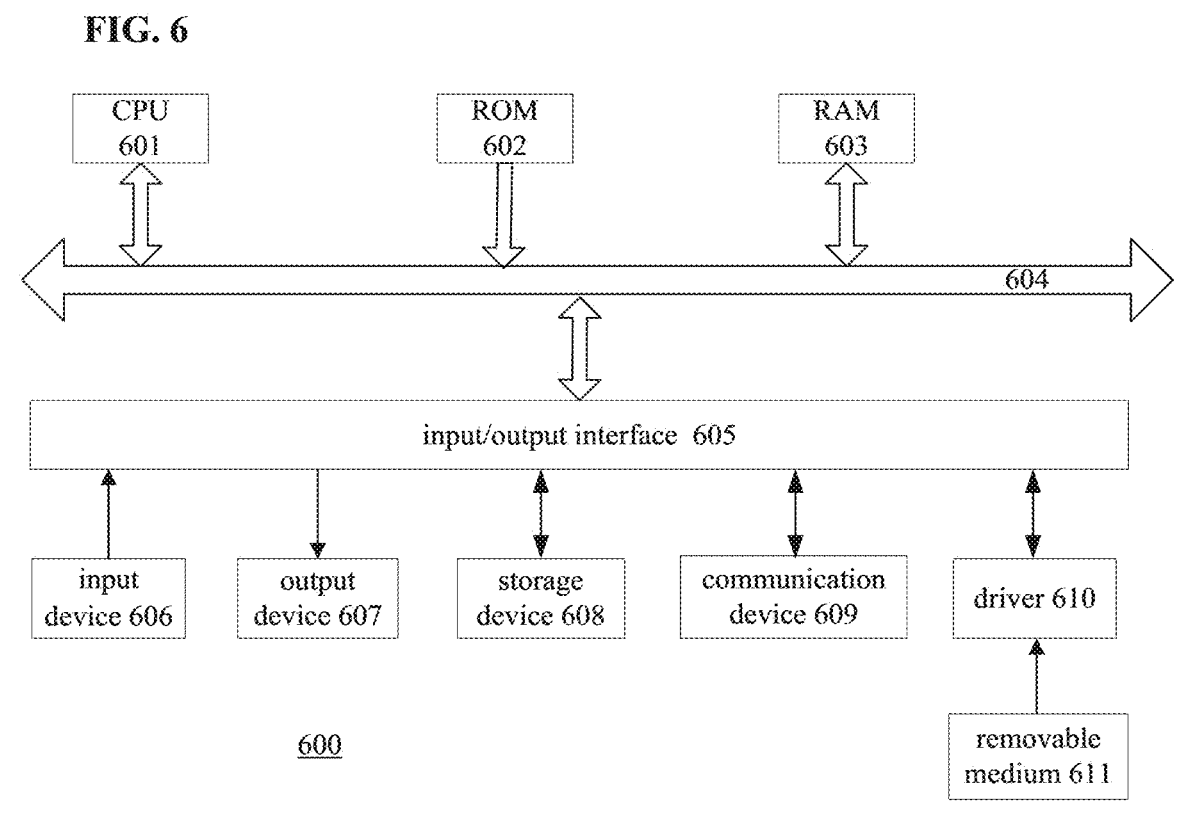

```
┌─────────┐        ┌─────────┐        ┌─────────┐
│   CPU   │        │   ROM   │        │   RAM   │
│   601   │        │   602   │        │   603   │
└─────────┘        └─────────┘        └─────────┘
     ⇕                  ⇓                  ⇕
═══════════════════════════════════════════════════════►  604
                        ⇕
┌─────────────────────────────────────────────────────────┐
│              input/output interface  605                 │
└─────────────────────────────────────────────────────────┘
     ↑          ↓          ↕            ↕            ↕
┌─────────┐┌─────────┐┌─────────┐┌──────────────┐┌─────────┐
│  input  ││ output  ││ storage ││communication ││driver 610│
│device 606││device 607││device 608││ device 609  ││         │
└─────────┘└─────────┘└─────────┘└──────────────┘└─────────┘
                                                       ↑
          600                                   ┌─────────┐
                                                │removable│
                                                │medium 611│
                                                └─────────┘
```

METHOD AND DEVICE FOR TARGET TRACKING AND STORAGE MEDIUM

CROSS-REFERENCE TO RELATED APPLICATION

This application claims priority to Chinese Patent Application No. 202211046789.5 filed on Aug. 30, 2022, the entire disclosure of which is hereby incorporated herein by reference.

FIELD

The present disclosure generally relates to target tracking technology, and specifically to Multi-Target Multi-Camera Tracking technology.

BACKGROUND

Multi-Target Multi-Camera Tracking (MTMCT) is currently a very important research topic in the field of video surveillance. It refers to finding the time and space locations of multiple targets in the videos captured by multiple cameras capturing different scenes respectively, and associating the time and space information of a target with the target. MTMCT integrates various computer vision technologies such as pedestrian detection, object detection, pedestrian re-recognition, object tracking, etc.

In practical applications, MTMCT still faces many problems and challenges. For example, the orientation of the target relative to the camera in the video may affect the association of tracklets of a single target. Specifically, in the videos captured by different cameras, a target may have different orientations (such as front, sideways or back) relative to the camera, and different orientations will lead to different appearance features of the target. This is disadvantageous to the existing method of associating tracklets based on features, because different appearance features will make it difficult to associate all tracklets that actually correspond to a single target with each other.

For example, there may be a situation where a tracklet in which a target has front orientation is associated with the target, but it is difficult to associate a tracklet in which the target has sideways orientation with the tracklet in which the target has front orientation because there is a great difference between the appearance when the target has sideways orientation and the appearance when the target has front orientation. As such, only the tracklet in which the target has front orientation can be obtained as tracking information, and therefore the accuracy and integrity of tracking information is decreased.

SUMMARY

To address the above technical problems, the present disclosure provides a cross-camera target association technology based on orientation estimation, which eliminates or mitigates the adverse impact on target association cause by appearance differences resulted from different orientations of a target, and significantly improves the performance of MTMCT.

According to one aspect of the present invention, a method for multi-target multi-camera tracking is provided. The method includes: performing multi-target tracking on an image sequence captured by each of a plurality of cameras that capture different scenes respectively, to extract a tracklet for each target appearing in the image sequence, wherein a plurality of tracklets for a plurality of targets are extracted on the basis of a plurality of image sequences captured by the plurality of cameras; extracting a feature for each tracklet; determining an orientation of each tracklet based on an orientation of the target relative to the camera in the tracklet; dividing the plurality of tracklets into a plurality of groups based on the determined orientations, wherein tracklets in the same group have the same orientation, and tracklets in different groups have different orientations; performing clustering on tracklets in each group based on the extracted features, such that tracklets corresponding to the same target are aggregated into an initial set; performing merging among a plurality of initial sets obtained by performing clustering on the plurality of groups respectively, such that tracklets corresponding to the same target and having different orientations are merged into a final set; and using the tracklets in the final set as tracking information for the corresponding target.

According to another aspect of the present invention, a device for multi-target multi-camera tracking is provided. The device includes a memory storing a computer program and a processor. The processor is configured to execute the computer program to perform operations of: performing multi-target tracking on an image sequence captured by each of a plurality of cameras that capture different scenes respectively, to extract a tracklet for each target appearing in the image sequence, wherein a plurality of tracklets for a plurality of targets are extracted on the basis of a plurality of image sequences captured by the plurality of cameras; extracting a feature for each tracklet; determining an orientation of each tracklet based on an orientation of the target relative to the camera in the tracklet; dividing the plurality of tracklets into a plurality of groups based on the determined orientations, wherein tracklets in the same group have the same orientation, and tracklets in different groups have different orientations; performing clustering on tracklets in each group based on the extracted features, such that tracklets corresponding to the same target are aggregated into an initial set; performing merging among a plurality of initial sets obtained by performing clustering on the plurality of groups respectively, such that tracklets corresponding to the same target and having different orientations are merged into a final set; and using the tracklets in the final set as tracking information for the corresponding target.

According to another aspect of the present invention, a non-transitory computer-readable storage medium storing a program is provided. The program, when executed by a computer, causes the computer to perform the method for multi-target multi-camera tracking described above.

BRIEF DESCRIPTION OF THE DRAWINGS

FIG. 4 is a flowchart showing a MTMCT method according to the present disclosure.

FIG. 6 is a block diagram showing an exemplary configuration of computer hardware for implementing the present disclosure.

DETAILED DESCRIPTION

Figure 1:
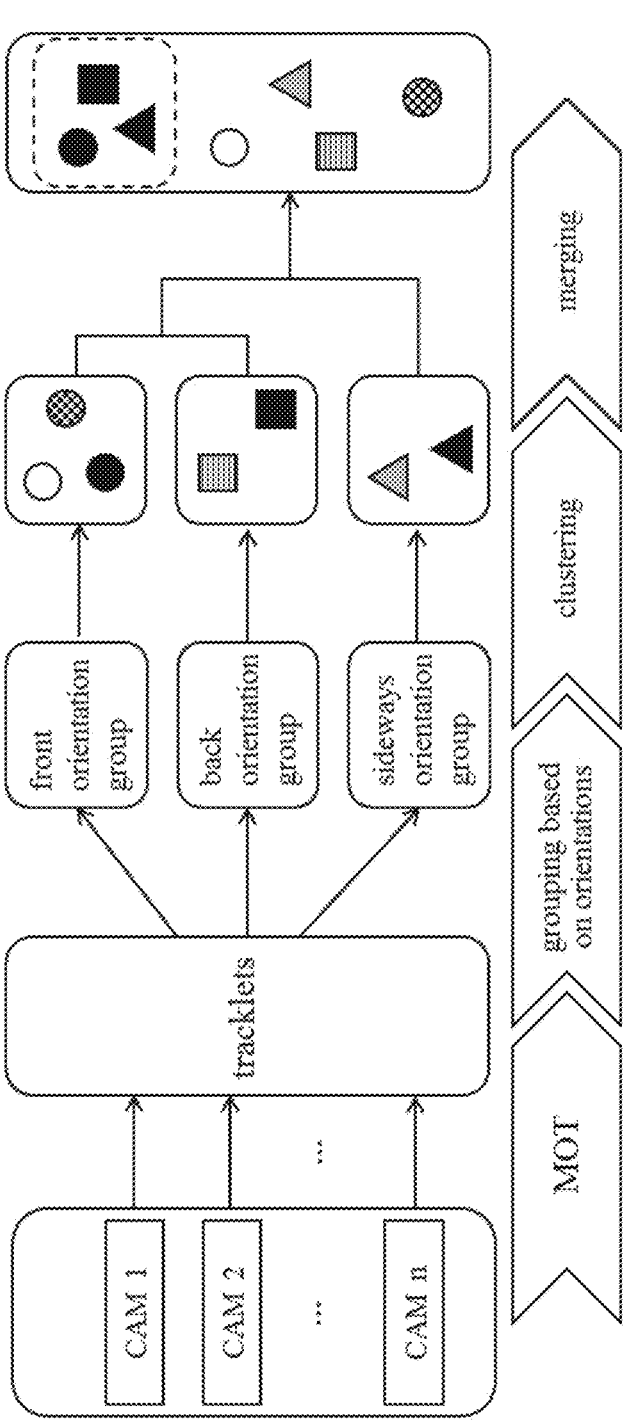
FIG. 1 schematically shows a conceptual diagram of MTMCT according to the present disclosure.

FIG. 1 schematically shows a conceptual diagram of MTMCT according to the present disclosure. First, videos captured by a plurality of cameras CAM 1-CAM n are received. The cameras CAM 1-CAM n capture different scenes respectively. For a video from a single camera, a tracklet may be extracted for each target appearing in the video using multi-target tracking (MOT). In this way, a number of tracklets of multiple targets maybe extracted from the videos captured by cameras CAM 1-CAM n.

In particular, a single target may appear in different scenes and therefore be captured by different cameras. As such, the tracklets extracted from the videos of different cameras may correspond to the same target.

A trajectory of a target during a certain time period may be formed based on multiple tracklets of the target, so as to obtain tracking information of the target. Since the trajectory of the target is usually distributed across multiple video frames, the tracklet may be a set of target boxes obtained by identifying the target in the multiple frames. As an example, one tracklet including multiple target boxes may be saved in an image folder according to the present disclosure.

Since the multi-target tracking (MOT) for a video captured by a single camera is a known to the skilled person in the art, the detailed description thereof is omitted in the present disclosure. Those skilled in the art can apply appropriate MOT technology to extract tracklets. As an example, ByteTrack model is employed in the present disclosure. The Bytetrack model is described in detail in "Bytetrack: Multi-Object Tracking by Associating Every Detection Box", Zhang, Y., Sun, P. et al, arXiv pre-print arXiv: 2110.06864 (2021), which is incorporated herein by reference.

A feature may be extracted for each of the obtained multiple tracklets (not shown in FIG. 1). For example, a visual feature may be extracted for each tracklet by applying pedestrian re-identification (Re-ID) technology. Since one tracklet may be a set of target boxes, visual features of respective target boxes may be extracted using Re-ID technology. Therefore, the feature of the tracklet may be a set of features of the respective target boxes.

Since the Re-ID technology is known to the skilled person, the detailed description thereof is omitted in the present disclosure. Those skilled in the art can apply appropriate Re-ID technology to extract features. As an example, OSNet model is employed in the present disclosure. The OSNet model is described in detail in "Omni-Scale Feature Learning for Person Re-Identification", K Zhou, Y. Yang, et al, ICCV, 2019, pages 3702-3712, which is incorporated herein by reference.

Then, as shown in FIG. 1, the obtained multiple tracklets may be divided into several groups, such as a front orientation group, a back orientation group and a sideways orientation group. Tracklets in the same group have the same orientation, and tracklets in different groups have different orientations.

Figure 2:
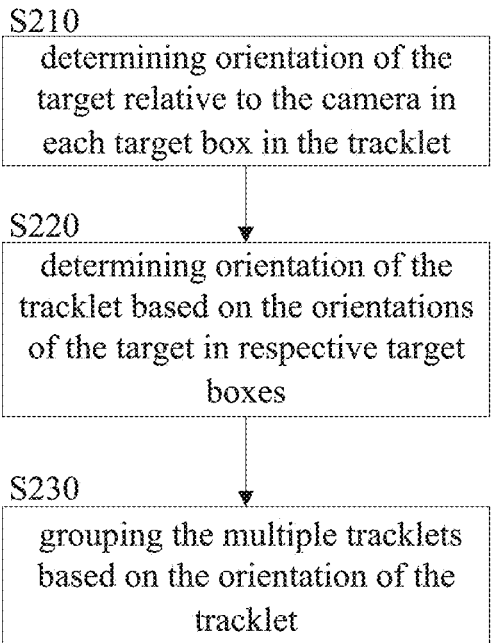
FIG. 2 is a flowchart showing a process of grouping tracklets.

The grouping process will be described in detail below in combination with FIG. 2. FIG. 2 is a flowchart showing a process of grouping the tracklets. In step S210, the orientation of the target relative to the camera in each tracklet is determined. More specifically, the orientation of the target relative to the camera in each of the target boxes in the tracklet is determined. In this step, various methods may be used to estimate the orientation of the target in the target box. For example, a supervised training method or a method of fine-tuning on the basis of a pre-trained model may be used. It is necessary to label data in advance in order to train the model in these two methods. In addition, a zero-sample method may be used, that is, a trained large model is used for orientation estimation. Data labeling and training is not required in this method. In addition, attribute recognition technology may be used to estimate the orientation of the target in the target box. As an example, the present disclosure employs the attribute recognition technology described in "Improving pediatric attribute recognition with weakly-supervised multi-scale attribute-specific localization", Tang C, Sheng L, et al., Proceedings of IEEE/CVF International Conference on Computer Vision, 2019: (4997-5006).

Then, in step S220, the orientation of the tracklet is determined based on the orientations of the target in respective target boxes. Specifically, when the number of target boxes in which the orientation of the target is a specific orientation is larger than a predetermined threshold, the orientation of the tracklet may be determined to be the specific orientation. If the orientation of the tracklet cannot be determined based on this rule, for example when the number of target boxes corresponding to any orientation does not exceed the predetermined threshold, the orientation of the tracklet may be determined to be the orientation to which the largest number of target boxes correspond.

In particular, the orientation determined for each tracklet in this way may be one or more orientations. For example, when the number of target boxes corresponding to the front orientation and the number of target boxes corresponding to the sideways orientation are each larger than the threshold value, the orientation of the tracklet may be determined to be both the front orientation and the sideways orientation.

Then, in step S230, tracklets are grouped based on the orientation of the tracklet. A front orientation group, a back orientation group and a sideways orientation group are schematically shown in FIG. 1. In particular, a tracklet may be determined to have multiple orientations as described above, so the tracklet may be assigned to multiple groups at the same time.

In addition, it should be noted that the present disclosure is not limited to the three groups shown in FIG. 1. Those skilled in the art can set more or fewer groups and use other orientations than the front orientation, back orientation and sideways orientation.

Referring back to FIG. 1, after grouping, clustering is performed on the tracklets in each group based on the feature of the tracklet, such that the tracklets corresponding to the same target are aggregated into an initial set. Depending on the result of clustering, the tracklets in the initial set may be a tracklet of a single target captured by a single camera, or tracklets of a single target captured by different cameras. In other words, the initial set includes cross-camera tracklets corresponding to the same target, and these tracklets have the same orientation. As an example, an agglomerative clustering method is used in the present disclosure, and other known methods may also be used by the skilled person to perform clustering.

FIG. 1 schematically shows a clustering result for each group. It can be seen that three initial sets (represented by circles) are obtained based on the tracklets in the front orientation group, two initial sets (represented by squares) are obtained based on the tracklets in the back orientation group, and two initial sets (represented by triangles) are obtained based on the tracklets in the sideways orientation group. In addition, the three initial sets represented by black shapes actually correspond to the same target, and the initial sets represented by other shapes (filled with different patterns) correspond to different targets.

Merging is then performed among the obtained initial sets such that the tracklets corresponding to the same target and having different orientations are merged into one set. In the process of merging, it is possible to first perform merging on the initial sets of two groups, and then merge the merged set with the initial sets of the remaining group. As schematically shown in FIG. 1, merging is first performed on the initial sets of the front orientation group and the back orientation group, and then the merged set is merged with the initial sets of the sideways orientation group. In addition, FIG. 1 shows that the tracklets in the three initial sets represented by black shapes are merged into a final set, while the other initial sets are not merged because they correspond to different targets.

Therefore, when different cameras capture tracklets having different orientations for the same target, these tracklets cannot be associated with each other using the conventional methods due to appearance differences caused by orientation differences of the target. The present disclosure can overcome this shortcoming by associating the tracklets with different orientations belonging to a target with the target, so as to obtain more accurate and complete tracking information.

Figure 3:
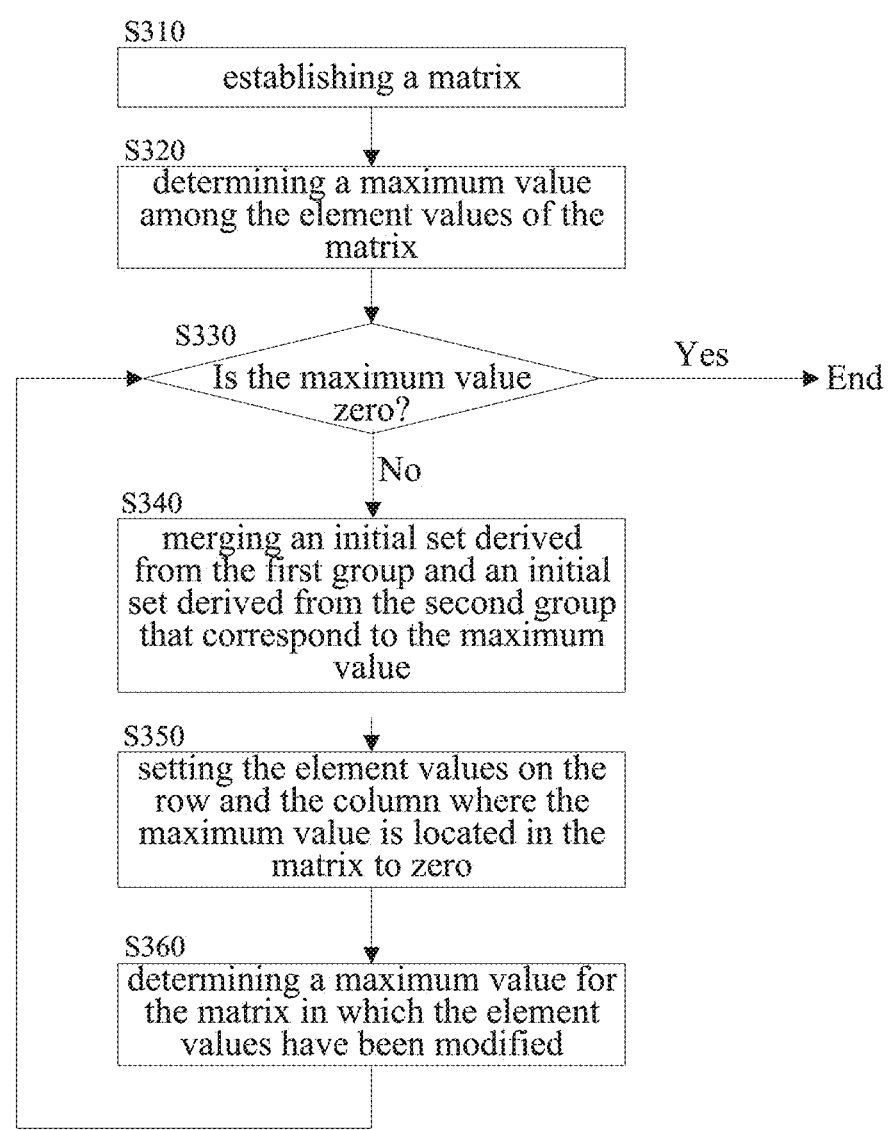
FIG. 3 is a flowchart showing a process of performing merge on initial sets.

The merging process will be described in detail below in connection with FIG. 3. FIG. 3 is a flowchart showing a process of merging the initial sets derived from two groups. In step S310, a M×N matrix is built. An element value of the matrix is the number of identical tracklets included in both of the following two initial sets: the i-th initial set obtained by performing clustering on a first group (such as the front orientation group), and the j-th initial set obtained by performing clustering on a second group (such as the back orientation group), wherein i=1, 2, . . . , M, j=1, 2, . . . , N, and M and N are natural numbers.

Then, in step S320, a maximum value among the element values of the matrix is determined, In step S330, it is determined whether the maximum value is zero. When the maximum value is determined to be zero, it means that M initial sets (corresponding to M targets) derived from the first group and N initial sets (corresponding to N targets) derived from the second group are independent of each other, that is, they do not correspond to the same target. Therefore, the merging process ends.

When it is determined that the maximum value is not zero in step S330, assuming that the position of the maximum value in the matrix is expressed as (a, b), the a-th initial set derived from the first group and the b-th initial set derived from the second group that correspond to the maximum value may be merged into one set in step S340, and then the element values on the a-th row and the b-th column where the maximum value is located in the matrix are set to zero in step S350. Then, in step S360, a maximum value is determined again for the matrix after the element values have been modified.

If the maximum value is not zero, steps S340 to S360 may be repeated. The merge process may end when the maximum value in the current matrix is determined to be zero.

The method of MTMCT according to the present disclosure and the functional modules for implementing the method will be described below in combination with FIGS. 4 and 5.

Figure 5:
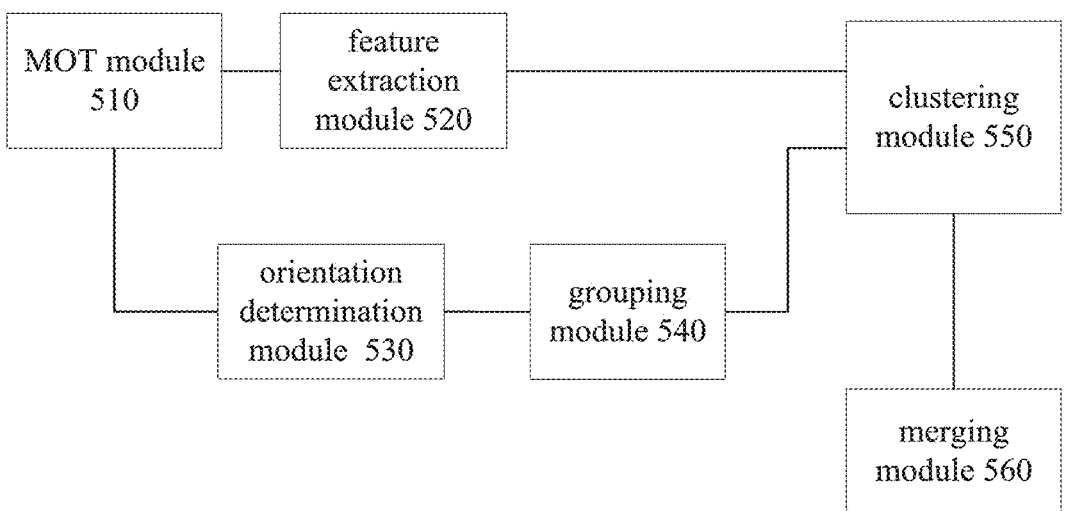
FIG. 5 shows functional modules for implementing the MTMCT method.

Referring to FIGS. 4 and 5, in step S410, the captured videos are received from multiple cameras capturing different scenes respectively. In step S420, multi-target tracking is performed on the video captured by each camera by a multi-target tracking (MOT) module 510 to extract a tracklet for each target appearing in the video. In this way, the MOT module 510 may extract multiple tracklets of multiple targets from multiple videos captured by multiple cameras.

Then, in step S430, a feature is extracted by a feature extraction module 520 for each of the multiple tracklets extracted by the MOT module 510.

Then, in step S440, for each tracklet, orientations of the target relative to the camera in respective target boxes in the tracklet are determined, and the orientation of the tracklet is determined based on the orientations of the target in the respective target boxes, by an orientation determination module 530.

Then, in step S450, the extracted tracklets are divided into multiple groups by a grouping module 540 based on the orientation of the tracklet. Tracklets in the same group have the same orientation, and tracklets in different groups have different orientations.

Then, in step S460, clustering is performed on the tracklets in each group by a clustering module 550 based on the feature of the tracklet, such that the tracklets corresponding to the same target are aggregated into an initial set.

Then, in step S470, merging is performed by a merging module 560 among multiple initial sets obtained by performing clustering on the respective groups, such that the tracklets corresponding to the same target and having different orientations are merged into a final set. The tracklets in the final set may be used as tracking information of the corresponding target.

It should be noted that the method according to the present disclosure is not limited to the sequence shown in FIG. 4. The method can be executed in a different order as long as it is technically feasible. For example, step S430 may be executed after step S450 or in parallel with steps S440 and S450.

The technology according to the present disclosure has been described above in combination with specific embodiments. The MTMCT according to the present disclosure can overcome the shortcomings of the conventional methods and identify the tracklets with multiple orientations belonging to a single target, and thereby obtain more accurate and complete tracking information.

The method described in the embodiments may be implemented by software, hardware, or a combination of software and hardware. Programs included in the software may be pre-stored in a storage medium arranged inside or outside a device. As an example, during execution, these programs are written into a random access memory (RAM) and executed by a processor (such as CPU), to implement the methods and processes described herein.

FIG. 6 is a block diagram showing an exemplary configuration of computer hardware for implementing the method of the present disclosure according to programs. The device for MTMCT according to the present disclosure can be implemented based on the computer hardware.

As shown in FIG. 6, in a computer 600, a central processing unit (CPU) 601, a read only memory (ROM) 602, and a random-access memory (RAM) 603 are connected to each other via a bus 604.

An input/output interface 605 is further connected to the bus 604. The input/output interface 605 is connected to the following components: an input device 606 formed with keyboard, mouse, microphone and the like; an output device 607 formed with display, speaker and the like; a storage device 608 formed with hard disk, non-volatile memory and the like; a communication device 609 formed by a network interface card (such as local area network (LAN) card, and modem); and a driver 610 for driving a removable medium 611. The removable medium 611 is for example a magnetic disk, an optical disk, a magneto-optical disk, or a semiconductor memory.

In the computer with the above structure, the CPU 601 loads the program stored in the storage device 608 into the RAM 603 via the input/output interface 605 and the bus 604, and executes the program to perform the method described above.

A program to be executed by the computer (CPU 601) may be recorded on a removable medium 611 which may be a package medium. The package medium is formed with for example a magnetic disk (including floppy disk), an optical disk (including compact disk-read only memory (CD-ROM)), digital versatile disk (DVD), or the like), a mag-neto-optical disk, or a semiconductor memory. In addition, the program to be executed by the computer (CPU 601) may also be provided via a wired or wireless transmission medium such as local area network, Internet, or digital satellite broadcasting.

In a case that the removable medium 611 is installed in the drive 610, the program may be installed in the storage device 608 through the input/output interface 605. In addition, the program may be received by the communication unit 609 via a wired or wireless transmission medium, and installed in the storage unit 608. Alternatively, the program may be installed in the ROM 602 or the storage unit 608 in advance.

The program to be executed by the computer may be a program that performs processes in the order described in the present disclosure, or may be a program that performs processes in parallel or when necessary (e.g., when invoked).

The modules or devices described herein are only in logical sense, and do not strictly correspond to physical apparatuses or entities. For example, a function of each of the modules described herein can be implemented by mul-tiple physical entities, or, functions of multiple modules described herein may be implemented by a single physical entity. In addition, features, components, elements, steps or the like described in one embodiment are not limited to the embodiment, but may also be applied in other embodiments to for example replace or combine with specific features, components, elements, steps or the like in other embodi-ments.

The scope of the present invention is not limited to the embodiments described herein. Those skilled in the art should understand that, depending on design requirements and other factors, various modifications or changes may be made to the embodiments herein without departing from principle of the present invention. The scope of the present invention is defined by the appended claims and their equivalents.

In addition, the following embodiments are also included in the present invention.

(1). A method for multi-target multi-camera tracking, comprising:

performing multi-target tracking on an image sequence captured by each of a plurality of cameras that capture different scenes respectively, to extract a tracklet for each target appearing in the image sequence, wherein a plurality of tracklets for a plurality of targets are extracted on the basis of a plurality of image sequences captured by the plurality of cameras;

extracting a feature for each tracklet;

determining an orientation of each tracklet based on an orientation of the target relative to the camera in the tracklet;

dividing the plurality of tracklets into a plurality of groups based on the determined orientations, wherein tracklets in a same group have a same orientation, and tracklets in different groups have different orientations;

performing clustering on tracklets in each group based on the extracted features, such that tracklets corresponding to a same target are aggregated into an initial set;

performing merging among a plurality of initial sets obtained by performing clustering on the plurality of groups respectively, such that tracklets corresponding to the same target and having different orientations are merged into a final set; and using the tracklets in the final set as tracking information for the corresponding target.

(2). The method according to (1), wherein the orientation of the target relative to the camera is one of front, back, and sideways.

(3). The method according to (1), wherein each tracklet is a set of target boxes that identify the target in a plurality of frames of the image sequence respectively, the method further comprising:

determining the orientation of the target in each of the target boxes relative to the camera;

when the number of target boxes in which the orientation of the target is a specific orientation is larger than a first threshold, determining that the orientation of the track-let is the specific orientation; or when the number of target boxes in which the orientation of the target is a specific orientation is larger than the number of target boxes in which the orientation of the target is any other orientation, determining that the orientation of the tracklet is the specific orientation.

(4). The method according to (3), wherein each tracklet can be determined to have one or more orientations, and the tracklet can be included in one or more of the plurality of groups.

(5). The method according to (4), further comprising:

establishing a matrix, wherein an element value of the matrix is the number of identical tracklets included in both of the following two initial sets: an i-th initial set obtained by performing clustering on a first group corresponding to a first orientation, and an j-th initial set obtained by performing clustering on a second group corresponding to a second orientation, wherein i=1, 2, . . . , M, j=1, 2, . . . , N, and M and N are natural numbers.

(6). The method according to (5), further comprising:

determining a maximum value among the element values of the matrix; and not performing merging among the initial sets when the maximum value is zero.

(7). The method according to (5), further comprising:

determining a maximum value among the element values of the matrix; and when the maximum value is not zero, a) merging an initial set derived from the first group and an initial set derived from the second group that cor-respond to the maximum value into one set;

b) setting element values on a row and a column where the maximum value is located in the matrix to zero;

c) determining a maximum value among element values of the modified matrix; and d) iteratively performing the steps a) to c), until the maximum value among the element values of the matrix is zero (8). The method according to (7), wherein K initial sets are obtained by performing clustering on a third group corresponding to a third orientation, the method further comprising: after performing merging between the M initial sets derived from the first group and the N initial sets derived from the second group, performing merging between the resulted sets and the K initial sets derived from the third group.

(9). A device for multi-target multi-camera tracking, comprising:

a memory storing a computer program; and a processor configured to execute the computer program to perform operations of:

performing multi-target tracking on an image sequence captured by each of a plurality of cameras that capture different scenes respectively, to extract a tracklet for each target appearing in the image sequence, wherein a plurality of tracklets for a plurality of targets are extracted on the basis of a plurality of image sequences captured by the plurality of cameras;

extracting a feature for each tracklet;

determining an orientation of each tracklet based on an orientation of the target relative to the camera in the tracklet;

dividing the plurality of tracklets into a plurality of groups based on the determined orientations, wherein tracklets in a same group have a same orientation, and tracklets in different groups have different orientations;

performing clustering on tracklets in each group based on the extracted features, such that tracklets corresponding to a same target are aggregated into an initial set;

performing merging among a plurality of initial sets obtained by performing clustering on the plurality of groups respectively, such that tracklets corresponding to the same target and having different orientations are merged into a final set; and using the tracklets in the final set as tracking information for the corresponding target.

(10). The device according to (9), wherein the orientation of the target relative to the camera is one of front, back, and sideways.

(11). The device according to (9), wherein each tracklet is a set of target boxes that identify the target in a plurality of frames of the image sequence respectively, the processor is further configured to:

determining the orientation of the target in each of the target boxes relative to the camera;

when the number of target boxes in which the orientation of the target is a specific orientation is larger than a first threshold, determining that the orientation of the tracklet is the specific orientation; or when the number of target boxes in which the orientation of the target is a specific orientation is larger than the number of target boxes in which the orientation of the target is any other orientation, determining that the orientation of the tracklet is the specific orientation (12). The device according to (11), wherein each tracklet can be determined to have one or more orientations, and the tracklet can be included in one or more of the plurality of groups.

(13). The device according to (12), the processor is further configured to establish a matrix, wherein an element value of the matrix is the number of identical tracklets included in both of the following two initial sets: an i-th initial set obtained by performing clustering on a first group corresponding to a first orientation, and an j-th initial set obtained by performing clustering on a second group corresponding to a second orientation, wherein $i=1, 2, \ldots, M$, $j=1, 2, \ldots, N$, and M and N are natural numbers.

(14). The device according to (13), the processor is further configured to:

determining a maximum value among the element values of the matrix; and not performing merging among the initial sets when the maximum value is zero.

(15). The device according to (13), the processor is further configured to:

determining a maximum value among the element values of the matrix; and when the maximum value is not zero, a) merging an initial set derived from the first group and an initial set derived from the second group that correspond to the maximum value into one set;

b) setting element values on a row and a column where the maximum value is located in the matrix to zero;

c) determining a maximum value among element values of the modified matrix; and d) iteratively performing the steps a) to c), until the maximum value among the element values of the matrix is zero.

(16). The device according to (15), wherein K initial sets are obtained by performing clustering on a third group corresponding to a third orientation, the processor is further configured to: after performing merging between the M initial sets derived from the first group and the N initial sets derived from the second group, performing merging between the resulted sets and the K initial sets derived from the third group.

(17). A non-transitory computer-readable storage medium storing a program that, when executed by a computer, causes the computer to perform the method for multi-target multi-camera tracking according to any one of (1) to (8).

The invention claimed is:

1. A method for multi-target multi-camera tracking, comprising:

performing multi-target tracking on an image sequence captured by each of a plurality of cameras that capture different scenes respectively, to extract a tracklet for each target appearing in the image sequence, wherein a plurality of tracklets for a plurality of targets are extracted on the basis of a plurality of image sequences captured by the plurality of cameras;

extracting a feature for each tracklet;

determining an orientation of each tracklet based on an orientation of the target relative to the camera in the tracklet;

dividing the plurality of tracklets into a plurality of groups based on the determined orientations, wherein tracklets in a same group have a same orientation, and tracklets in different groups have different orientations;

performing clustering on tracklets in each group based on the extracted features, such that tracklets corresponding to a same target are aggregated into an initial set;

performing merging among a plurality of initial sets obtained by performing clustering on the plurality of groups respectively, such that tracklets corresponding to the same target and having different orientations are merged into a final set; and using the tracklets in the final set as tracking information for the corresponding target, wherein each tracklet is a set of target boxes that identify the target in a plurality of frames of the image sequence respectively, the method further comprising:

determining the orientation of the target in each of the target boxes relative to the camera;

when the number of target boxes in which the orientation of the target is a specific orientation is larger than a first threshold, determining that the orientation of the tracklet is the specific orientation; or when the number of target boxes in which the orientation of the target is a specific orientation is larger than the number of target boxes in which the orientation of the target is any other orientation, determining that the orientation of the tracklet is the specific orientation.

2. The method according to claim 1, wherein the orientation of the target relative to the camera is one of front, back, and sideways.

3. The method according to claim 1, wherein each tracklet can be determined to have one or more orientations, and the tracklet can be included in one or more of the plurality of groups.

4. The method according to claim 3, further comprising: establishing a matrix, wherein an element value of the matrix is the number of identical tracklets included in both of the following two initial sets: an i-th initial set obtained by performing clustering on a first group corresponding to a first orientation, and an j-th initial set obtained by performing clustering on a second group corresponding to a second orientation, wherein $i=1, 2, \ldots, M, j=1, 2, \ldots, N$, and M and N are natural numbers.

5. The method according to claim 4, further comprising: determining a maximum value among the element values of the matrix; and not performing merging among the initial sets when the maximum value is zero.

6. The method according to claim 4, further comprising: determining a maximum value among the element values of the matrix; and when the maximum value is not zero, a) merging an initial set derived from the first group and an initial set derived from the second group that correspond to the maximum value into one set;

b) setting element values on a row and a column where the maximum value is located in the matrix to zero;

c) determining a maximum value among element values of the modified matrix; and d) iteratively performing the steps a) to c), until the maximum value among the element values of the matrix is zero.

7. The method according to claim 6, wherein K initial sets are obtained by performing clustering on a third group corresponding to a third orientation, the method further comprising: after performing merging between the M initial sets derived from the first group and the N initial sets derived from the second group, performing merging between the resulted sets and the K initial sets derived from the third group.

8. A non-transitory computer-readable storage medium storing a program that, when executed by a computer, causes the computer to perform the method for multi-target multi-camera tracking according to claim 1.

9. The method according to claim 1, wherein extracting the feature for each tracklet comprises using pedestrian re-identification (Re-ID) technology.

10. The method according to claim 9, wherein the feature of the tracklet is a set of features of the respective target boxes.

11. The method according to claim 1, wherein performing clustering on tracklets includes using an agglomerative clustering method.

12. The method according to claim 1, wherein determining the orientation of the target includes using an attribute recognition model.

13. The method according to claim 1, wherein determining the orientation of the target includes using a zero-sample method based on a trained large model.

14. The method according to claim 1, wherein performing merging among the plurality of initial sets includes:

performing merging on initial sets of two groups to obtain a merged set; and merging the merged set with initial sets of a remaining group.

15. The method according to claim 14, wherein the two groups correspond to a front orientation and a back orientation, and the remaining group corresponds to a sideways orientation.

16. The method according to claim 1, wherein a specific tracklet is determined to have multiple orientations and is assigned to multiple groups.

17. The method according to claim 1, wherein determining the orientation of the target comprises using a supervised training method.

18. A device for multi-target multi-camera tracking, comprising:

a memory storing a computer program; and a processor configured to execute the computer program to perform operations of:

performing multi-target tracking on an image sequence captured by each of a plurality of cameras that capture different scenes respectively, to extract a tracklet for each target appearing in the image sequence, wherein a plurality of tracklets for a plurality of targets are extracted on the basis of a plurality of image sequences captured by the plurality of cameras;

extracting a feature for each tracklet;

determining an orientation of each tracklet based on an orientation of the target relative to the camera in the tracklet;

dividing the plurality of tracklets into a plurality of groups based on the determined orientations, wherein tracklets in a same group have a same orientation, and tracklets in different groups have different orientations;

performing clustering on tracklets in each group based on the extracted features, such that tracklets corresponding to a same target are aggregated into an initial set;

performing merging among a plurality of initial sets obtained by performing clustering on the plurality of groups respectively, such that tracklets corresponding to the same target and having different orientations are merged into a final set; and using the tracklets in the final set as tracking information for the corresponding target, wherein each tracklet is a set of target boxes that identify the target in a plurality of frames of the image sequence respectively, the method further comprising:

determining the orientation of the target in each of the target boxes relative to the camera;

when the number of target boxes in which the orientation of the target is a specific orientation is larger than a first threshold, determining that the orientation of the tracklet is the specific orientation; or when the number of target boxes in which the orientation of the target is a specific orientation is larger than the number of target boxes in which the orientation of the target is any other orientation, determining that the orientation of the tracklet is the specific orientation.

19. The device according to claim 18, wherein the processor is configured to extract the feature for each tracklet using pedestrian re-identification (Re-ID) technology.

20. The device according to claim 18, wherein the processor is configured to perform clustering on tracklets using an agglomerative clustering method.

\* \* \* \* \*